May 19, 1936.  P. M. FROMAGET  2,041,536
BAND BRAKE
Filed July 7, 1931  4 Sheets-Sheet 1
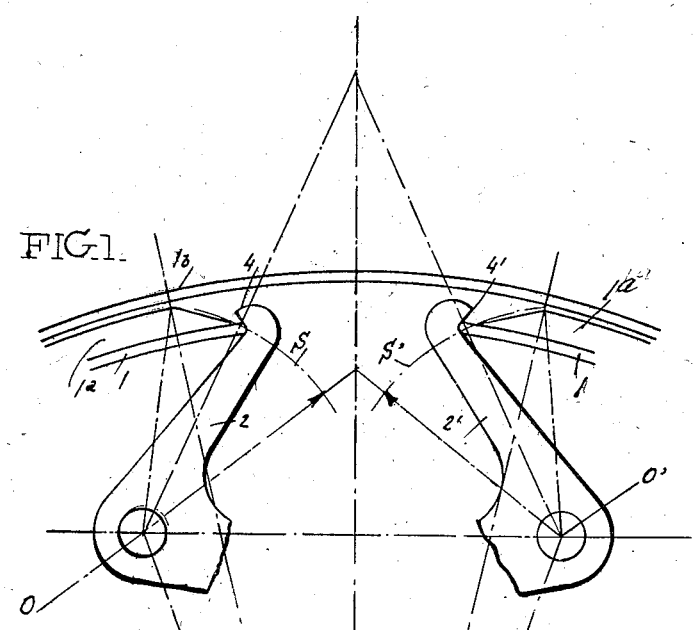
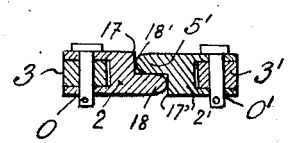
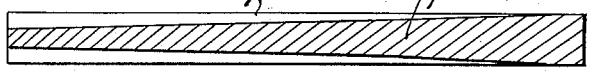
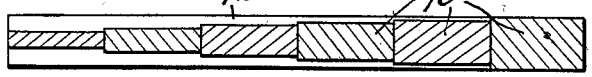
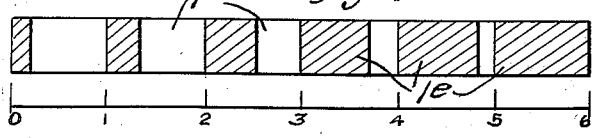
INVENTOR
Pierre M. Fromaget
BY Townsend & Decker
ATTORNEYS.

May 19, 1936. P. M. FROMAGET 2,041,536
BAND BRAKE
Filed July 7, 1931 4 Sheets-Sheet 2
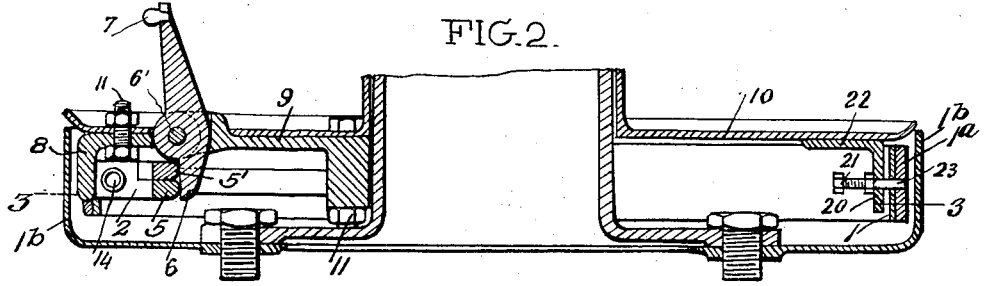
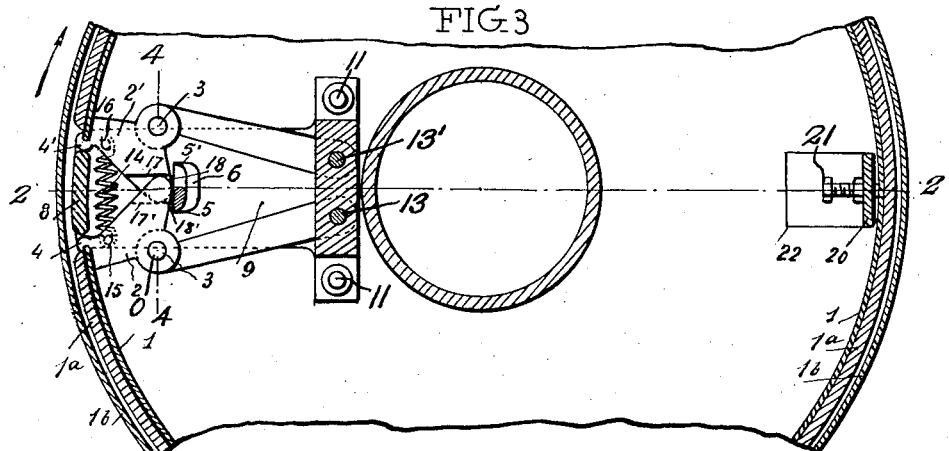
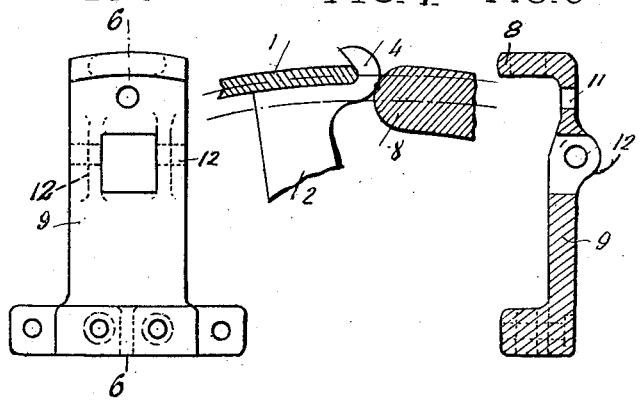
INVENTOR
Pierre M. Fromaget
BY Townsend & Decker
ATTORNEYS May 19, 1936.　　　P. M. FROMAGET　　　2,041,536
BAND BRAKE
Filed July 7, 1931　　　4 Sheets-Sheet 3
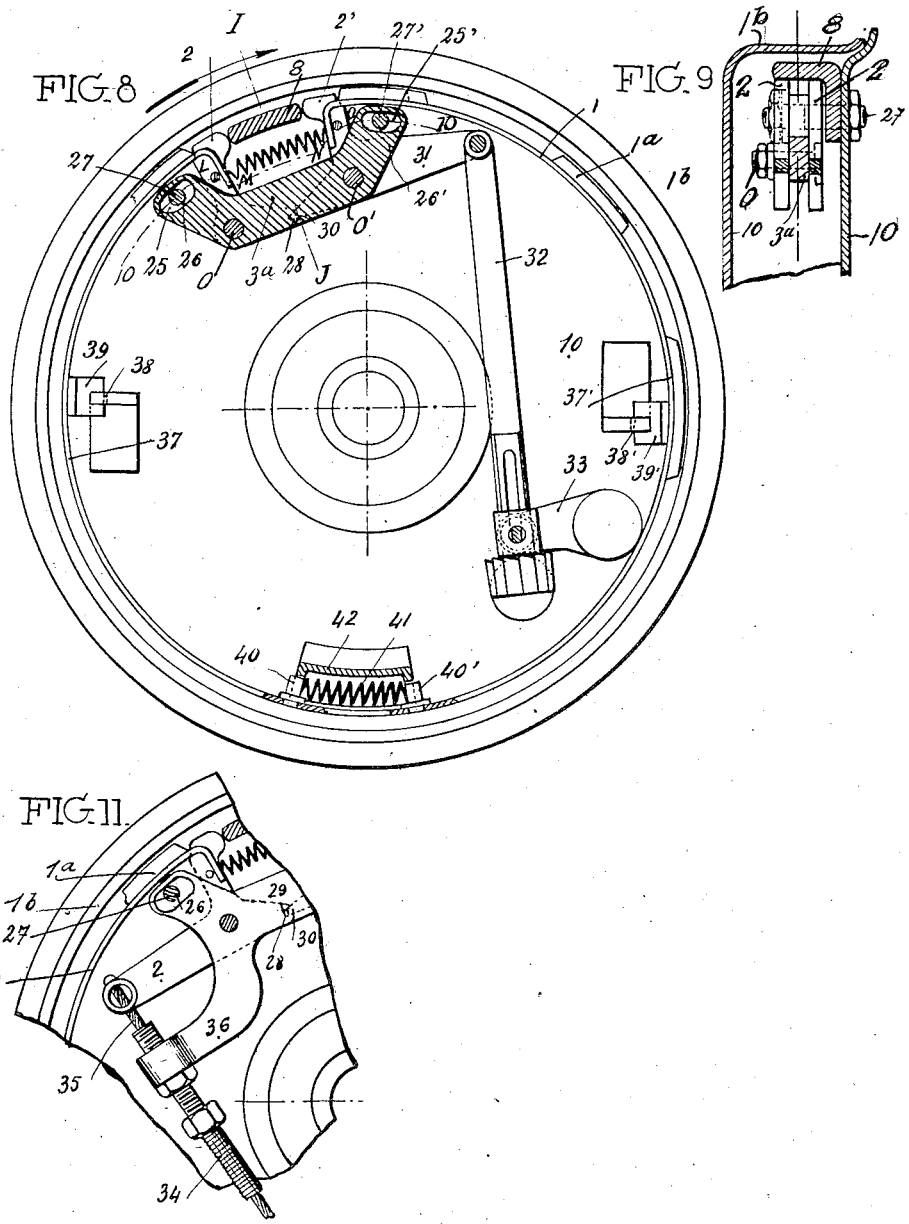

May 19, 1936.  P. M. FROMAGET  2,041,536
BAND BRAKE
Filed July 7, 1931  4 Sheets-Sheet 4
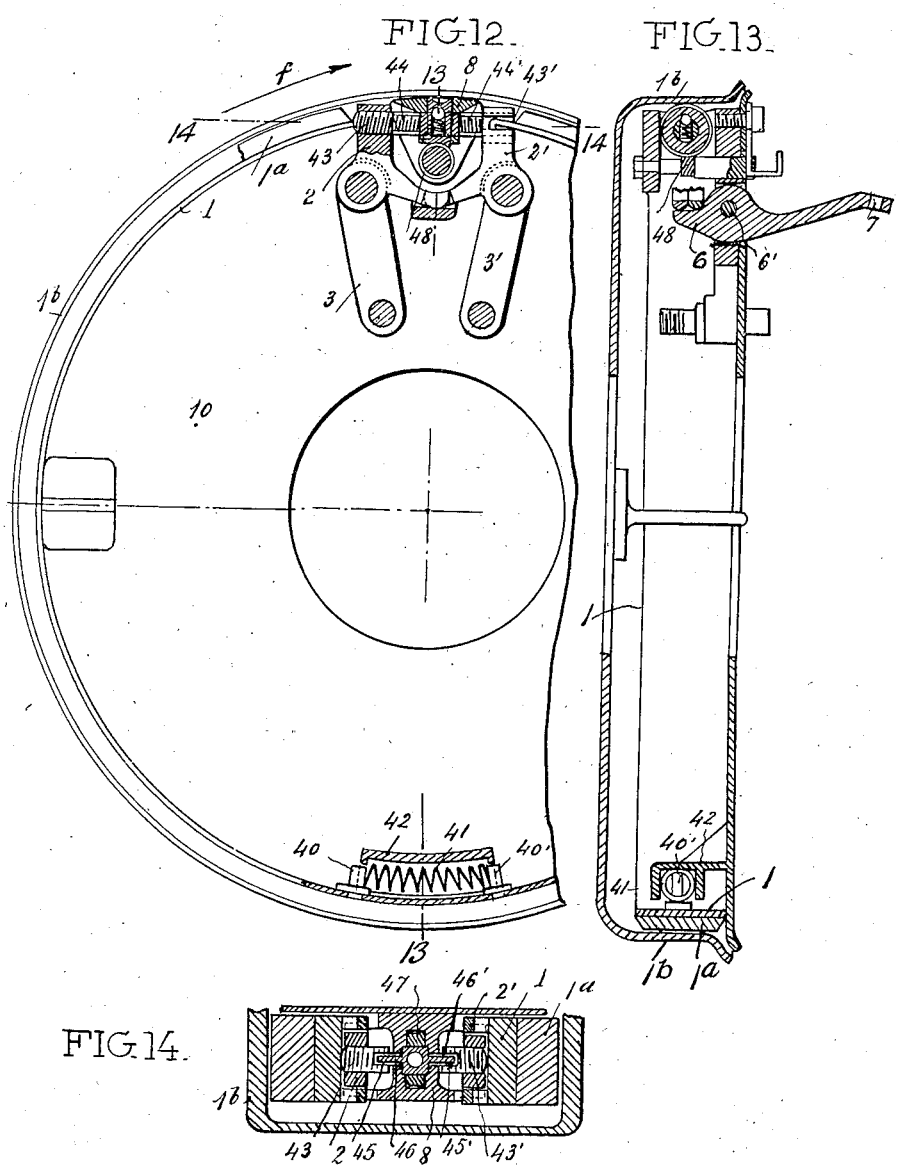
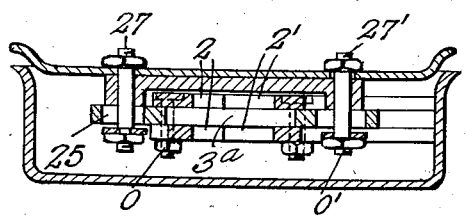
INVENTOR
Pierre M. Fromaget
BY Townsend & Becker
ATTORNEYS.

Patented May 19, 1936

2,041,536

UNITED STATES PATENT OFFICE 2,041,536

BAND BRAKE

Pierre Marie Fromaget, Toulon, France

Application July 7, 1931, Serial No. 549,189
In France July 16, 1930

9 Claims. (Cl. 188—78)

The present invention concerns improvements in band brakes with a fixed stop, and of the general type in which the ends of the band are drawn towards the periphery of the drum and away from each other to effect the braking action.

Among the advantages sought and accomplished by the present invention, is the provision of a brake which is light, simple, powerful, not readily gotten out of adjustment, does not grind, does not wear the brake drum oval, requires no precise centering, allows the brake lining to be used close to the point of complete erosion, and which acts adequately in both directions of rotation of the drum.

Another feature of the invention is the provision of actuating members for the brake band, which, as the lining wears, advance at the point of contact with the brake band, substantially upon an Archimedian spiral or similar working arc, and thereby, or in equivalent manner, maintain the band-actuating members advanced as wear of the lining occurs and yet always acting at the same angle regardless of the position resulting from wear.

According to my invention, a band brake is provided between the ends of which is a fixed stop for limiting contracting of the band, and also between the ends of which provision is made for separating the ends, thereby expanding the brake. Furthermore, as the separating or expanding action is exerted on the ends of the band, and permitted by successive stages of wear of the brake lining, such that the radius of the band is increased concentric to itself in its successive positions, each band end in arriving at those successive positions describes an arc or curve (referred to for convenience as the successive-position curve) which is, in the prior art, different from the normal curve described by the end of the band when applying and releasing the brake. By my invention, I make these curves substantially co-incident. The radius from the center of the band (and wheel) to the end of the band, according to my invention, makes a constant angle with the tangent to said successive-position curve at that point of coincidence of curve, tangent and radius. The structure hereinafter shown and described, produces the condition of constant angular relationship. While I have chosen to refer to the extreme ends of the bands as points for convenient identification, the same constant angular relationship of the tangent to the successive-position curve and the brake-band radius exists when considering, for instance, the end point of the brake-band lining, which is usually an inch or more from the end of the band.

My invention consists, therefore, in a band brake having a fixed stop, with the ends of the band adapted to be spread by inclusion therebetween of two levers having pivotal centers which are also distinct and displaceable in a generally peripheral direction with respect to the drum, the invention further being characterized by the fact that the position of the said pivotal centers of the levers with respect to the ends of the band and the length of the levers are selected in such manner that each end of the band describes a path, the tangent to which forms a low constant angle with the tangent of the periphery of the drum at the point of contact of the band end with the periphery of the drum. Said characteristic feature supposes that the wear of the lining is substantially uniform. Under said conditions, the working of the brake will remain invariable during the whole life of the lining band. Further, owing to the position of the pivotal centers of the levers relative to the ends of the band, the pressure exerted by the levers will be almost completely transferred into tangential pressure. The smallness of the radial pressure prevents any grinding; no sudden and violent unrolling of the band will occur at the moment when the ends of the band come into contact with the periphery of the drum, since the band is completely developed at this moment of contact.

According to another characteristic of my invention, the regular wearing of the lining band is attained by giving to said lining a surface of contact which varies from end to end in function of the localized pressures resulting from the pushing exerted on the control levers. Designating the circumferential tension resulting from the operator's application of force by $t$, the coefficient of friction of the lining by $f$ and an arc of rotation by $\theta$, it is well known, that where T is the tangential pushing, $$T = e^{f\theta}$$

For a tangential pushing amounting to 100 kgs., the braking stresses (pressure due to friction) are respectively 28, 37, 46, 61, 76 and 97 kgs. for each successive radian of the circumference. It results therefrom that, by disposing a lining of constant thickness on surfaces proportional to the said pressures (braking stresses) on each successive radian, I realize a mean wearing of the lining for the given arc of rotation. According to my invention, the developed lining may be either a continuous trapezoidal band (that is, having a width increasing from the applied end) or a sectional shape (that is, a lining made up of spaced blocks or sections). In this latter case, the blocks may provide wearing surfaces of equal width but of different lengths proportional to the mean pressure applied on each block. Conversely, the blocks may also be made with constant lengths but with widths proportional to the mean pressure exerted on each block.

Furthermore, my invention seeks to overcome deficiencies of prior art band brakes having floating levers opening the ends of the band for applying the latter to the drum. Certain prior art brakes are provided with adjustable stops and means for separately compensating for the radial and tangential play due to the wear of the lining; such disposition entraining the provision of complicated apparatus and the loss of a great part of the braking action. The brake according to my invention, automatically compensates for the wear of the lining. My improved brake, by virtue of the special guiding of the band ends, permits engaging the lining onto the drum under conditions which remain constant for the entire life of the brake. My brake presents all advantages resultant from the brakes having a great arc of contact of the lining on the drum, such as great power in and a regular progression of braking; furthermore, the even or regular working, the absence of any grinding (resulting from the low angle of attack and the uniform wear) entrain many other appreciable advantages, such as simplicity of construction and operation as well as economical maintenance. Other advantages and results will become apparrent as the description progresses.

In the accompanying drawings, in which like numerals of reference indicate similar parts throughout the several views;

Figure 1 shows diagrammatically with a part of my improved brake structure, the basic concept of brake-applying parts compensating for wear and maintaining the desired angle of application of force;

Figure 2 is a diametral section on line 2—2 of Fig. 3, showing one physical embodiment of the invention;

Figure 3 is a sectional view normal to the plane of the section of Fig. 2, on line 3—3 thereof;

Figure 4 is a sectional view on a chordal plane to the brake drum through the two pivotal centers of the band-actuating levers, as upon line 4—4 of Fig. 3;

Figure 5 is a face elevation of the supporting plate for the lever-operating arms, which plate also includes the fixed stop for the ends of the band;

Figure 6 is a longitudinal section of this supporting plate as upon line 6—6 of Fig. 5;

Figure 7 is a detail sectional-elevational view of one end of the brake band, stop and operating lever;

Figure 8 is an elevational section, similar to Fig. 3, showing a modified construction of brake-band operating or expanding means;

Figure 9 is a diametral sectional view of the brake drum next to the fixed stop and showing the band-operating levers associated therewith;

Figure 10 is a cross sectional view as upon broken line 10—10 of Fig. 8;

Figure 11 is a fragmentary view in elevation, similar to Figs. 3 and 8, showing a modification particularly as to the means for applying the external or controlling actuation of the operator by cable connection;

Figure 12 is a further elevational section similar to Figs. 3, 8 and 11, showing modified structure particularly as to the operating lever and stop wherein the stop is made adjustable;

Figure 13 is a diametral section, as upon line 13—13 of the modified construction of Fig. 12;

Figure 14 is a chordal section with respect to the drum, taken through and longitudinally of the said adjustable stop, as upon line 14—14 of Fig. 12; and Figures 15, 16 and 17 are elevational views of different forms of brake-band lining.

In the specific embodiment of the invention, and making reference initially to the broader aspect of the concept depicted by Figure 1, a resilient metal brake-band 1 is shown upon the outer curved face of which is mounted a suitable frictional brake-lining 1a the outer curved surface of which is operatively associated contiguous to the inner cylindrical surface of a brake drum 1b. The inherent contracting resiliency of the band 1 maintains the band normally out of contact with the drum. For purposes of applying the brake, the ends of the band are moved away from each other, that is, are separated, thereby increasing the effective diameter of the band, which is commonly referred to as expanding the band. Levers 2 and 2' pivoted respectively at 0 and 0' are shown for effecting the band expansion. It is a desideratum of the present invention, that the said levers 2, 2' shall have a positive connection with the band, with a pre-determined relationship between the impelling force moving the band end longitudinally to the impelling force moving the band radially at its end. The radial movement is very small compared to the longitudinal movement but with such proportion that there is substantially the same braking force applied by the ends of the band against the drum as is applied at an intermediate part of the band. The present invention contemplates maintaining this desirable proportion of forces even to a condition of almost entire erosion of the lining.

Considering an end point of a brake band as a convenient definite location for descriptive purposes, it may be stated that expanding a band from its released position to its friction applying position causes that point to describe a curve or arc. Also, considering the same point under conditions of the lining wearing from full thickness to complete erosion, an arc or curve is described gradually approaching more and more as wear continues to coincidence with curvature of the drum. By the present invention, I provide a structure which brings these two curves substantially into coincidence, and enabling the braking forces to remain the same throughout the successive stages of wear. This curve, when accurately developed, is an Archimedian spiral. Since, however, only a moderately short length of such curve is actually utilized, an arc of a true circle may be substituted which will be substantially coincident therewith. For ascertaining the center of curvature of such substituted arc, a tangent may be drawn to the Archimedian curve at the point of the arc established when the lining is new, another tangent may be drawn at the point established by partial wear of the lining, and a third tangent may be drawn at the point established when the lining is practically worn away. Lines drawn through the said three points normal to the respective tangents will intersect, and the mean position of these points of intersection is chosen as the center of curvature for the substituted arc. In the drawings, centers 0 and 0' and arcs S and S' are the centers and arcs thus determined for the respective ends of the brake band. When the points of tangency of any tangent to this arc and tangent to the drum, coincide, the tangents form an angle which is constant for any condition of wear. This angle between tangents is relatively small and is therefore indicative of the fact that in my improved brake only a small outward or radial component or pressure on the end of the band is being exerted proportionate to the considerably greater longitudinal pushing against the end of the band, and that this same proportionate distribution of pressure is constant regardless of the condition of wear.

Referring now more in detail to the specific embodiment of the invention disclosed in Figures 2 to 6, it will be observed that the levers 2, 2' are shown as bell-crank levers pivoted at 0 and 0' to the ends of rods 3, 3' respectively. These rods 3, 3' extend toward the center of the drum, and are pivoted to swing in the same plane or parallel plane to that in which said levers swing, with the pivoting of said rods as near to the axis of rotation of the drum as found practicable. As one convenient arrangement, I provide a bracket 9 upon the axle housing, and pivot said rods, as at 13, 13' to said bracket. Said bracket extends radially toward the rim of the drum, and at its outer end provides a laterally projecting stop 8 located in the brake assembly between the ends of the brake band.

The outer ends of levers 2, 2' extend between the stop 8 and the respective ends of the band, and are notched or otherwise formed thereat to secure operative engagement with the band ends. The faces of the stop which are engaged by the levers and the edges of the levers where engaging the stop are preferably rounded to enable the levers, at times, to swing with this point of engagement acting as a fulcrum.

From the description of the levers 2, 2' so far given, it will be observed that one corner of the bell-crank formation thereof provides for the pivotal mounting of the levers, a second corner provides the band-engaging or work-applying parts. The third corner of each lever, conveniently termed its heel, 5 or 5' constitutes the part thereof receiving the external actuating pressure applied through suitable linkage by the operator. The heels of these levers extend toward each other and overlap, each having an abutment or flat portion 17, 17' to be engaged by the rounded extremity 18, 18' of the other heel.

Transverse to the plane of swinging of the levers, and projecting through a suitable opening in bracket 9, is a brake-operating lever 6 the inner end of which underlies both heels of the levers 2, 2' so as to operate them together. Brake-operating lever 6 is carried upon a pin 6' in turn mounted in trunnions 12, 12 formed as part of bracket 9 in such manner that the axis of pivoting of this lever is substantially in the plane of the side wall 10 of the fixed part of the drum and axle housing. This wall likewise provides appropriate opening for the projection of the trunnions and brake-drum lever therethrough. It is furthermore to this wall that I have shown said bracket 9 secured, as by bolts 11. In utilization of my invention on front wheels of vehicles or wheels which have to oscillate upon a steering axis, lever 6 is extended to intersect such axis of steering and provided thereat with suitable linkage connection 7 through which the lever may be controlled irrespective of the steering position of the wheel.

When brake-drum lever 6 is swung toward the heels of levers 2, 2', these latter levers are both swung, and thereupon spread the ends of the band. Release of the pressure on the brake-drum lever permits the ends of the band to return toward each other under the influence of the inherent resiliency of the band, supplemented, if desired, by a spiral tension spring 14 the opposite ends of which are secured, as at 15 and 16 to levers 2, 2' respectively.

Preferably midway between the ends of the band, the same is shown as held by a supporting device 20, which may conveniently comprise a bolt 21 screwed radially of the drum through an angle plate 22 which is itself secured to the brake-drum housing wall 10. The outer end of the bolt 21 is smooth, that is, unthreaded, and as shown at 23, enters a suitable boring in the band with sufficient play to allow the band to move to the extent necessary. Although only one such support, for convenience of illustration is shown, I deem it within the scope of the invention, and probably preferable from mechanical considerations to provide two, disposed at about 120° in each direction from stop 8.

During the operation of my improved brake, actuation of the same by operating brake-drum lever 6, the heels of levers 2, 2' are swung, and because of their abutting relation at a point offset from a line connecting their pivotal centers, and by virtue of the floating mounting of those pivotal centers by rods 3, 3', those centers may move slightly away from each other, and are forced by said levers to so move. Swinging of the levers 2, 2' brings the brake lining into contact with the drum, rotating in direction of arrow f, which thereupon effects a slight rotation of the band until portion 4 or 4' of the lever engages stop 8 whereupon the entire gap due to the spread of the band is between the other side of stop 8 and the other lever. Stop 8 absorbs the tangential braking reaction which therefore leaves the brake rigging unaffected, enabling the same to be made lighter, and securing a better brake control.

Instead of levers 2, 2' being oscillated by means of a lever 6, any equivalent device may be used, said device being suitably constructed to operate the levers.

In order to compensate the brake, i. e., to use reaction in order to generate a portion of the force required for braking, the end surfaces of the stop may be rounded.

If lever 2 be considered, for example (Fig. 7), the rounded portion is such that the point of contact of heel 4 with said lever, upon which acts the reaction r ultimately absorbed by stop 8, is beyond the point where band 1 transmits said reaction to heel 4, the distances being computed from the axis of the joint of said lever 2.

Under these conditions and due to said rounded portion, lever 2 tends to turn around its point of contact upon stop 8 and, owing to the connections, produces a tangential stress upon end 4' which is to be deducted from the effort to be made.

In practice, said compensation need only be considered in the case of driving in reverse gear.

Figs. 2 to 7 show a constructional embodiment of a brake whose drum revolves in the direction of arrow *f* during forward driving. In these figures the heels 5, 5' of levers 2, 2' have been shown intentionally at unequal distances from axis 6' of the control lever in order to compensate somewhat the rapid opening of the brake-band, during forward driving, which is especially due to lever 2 whose heel 5 moves at the end of the longer lever arm and to the intense pressure at the end of the band caused by lever 2', whose heel 5' moves under impulse of a shorter lever arm. If increased pressure is desired in the case of reverse driving, it will be sufficient to compensate the band engaging part 4' as has already been explained (Fig. 7). Furthermore, if it be desired that the movements of the levers be equal, it is only necessary to make them exactly identical so that their heels come into action at equal distances from axis 6'.

It should be noted that the pressure which opens the band and the direction of said pressure are such that the band is wholly open at the moment of contact and is always applied according to the same angle of incidence. In such circumstances, the braking effect arises progressively and in proportion to the effort applied and no grinding arises, as is the case when opening is effected by a pressure having a radial component. In point of fact, neither the centres of oscillation of the levers and rods nor their respective lengths have been selected haphazard; they have all been predetermined as was explained in the case of Fig. 1.

In the braking device just described, the movements of heels 5 and 5' are ensured by the end or toe of a lever 7. Thus the end or toe may in practice be cam-shaped, to attain, by actuating pawl 2 faster than pawl 2', acceleration of the braking action at the moment of peripheral drive.

In the case of brakes of different diameters, the joints 13, 13' of rods 3, 3' may be arranged to suit the case.

In the constructional embodiment shown in Figs. 8 and 10, the dogs, levers or pawls 2, 2' are carried by the floating member 3ª which assumes the part played in the previous figures by rods 3, 3'. Said member 3ª upon which the pawls are pivoted at 3, 3', carries two curvilinear slides 25, 25' through which pass, with a certain degree of radial play, pins 27, 27' secured to the sidewall of the brake drum. Heels 5, 5' of the pawls are in alignment and mesh within each other by means of a simplified form of toothed gearing 28, 29, 30. Pawl 2' is extended by an arm 31 upon which acts a rod 32 actuated by a crank 33 whose axle passes through sidewall 10 of the brake drum. If the rod is pulled towards the lower part of the figure by means of crank 33, pawl 2' will be made to revolve around its axle and a tooth 28 on its end engaging between a pair of teeth on pawl 2 will cause pawl 2 to turn around its own axle and the brake will be applied as before. As soon as the brake is applied, band 1 is driven by the drum, carrying with it the pawls and at the same time the supporting member 3ª of the same which will slide upon pins 27, 27'. The degree of play allowed pins 27, 27' permits the band to be applied correctly upon the drum even though the latter should be slightly eccentric, and such application will not affect the brake riggings. The brake band is self-centering upon the drum.

As shown in Fig. 11, instead of pawl 2' being actuated by means of a rod 32, said actuation might be secured by means of a Bowden cable 34, 35, acting so as to bring up to an extension 3ᶜ of member 3ª an extension 36 of pawl 2.

Fig. 8 shows how the free portion of brake band 1 is held upon the sidewall 10 of the brake drum by means, on the one hand, of angle plates 37, 37' secured to band 1 and fitting within notches 38, 38' and of angle plates 39, 39' secured to the sidewall of the brake drum and, on the other hand, by means of nipples 40, 40' carried by band 1 and surrounding the ends of a spring 41 housed in a socket 42 and bearing against the two ends of the same, said housing being secured to sidewall 10 of the brake drum 10 and having its ends notched to allow nipples 40, 40' to enter therein and compress spring 41. The angle plates prevent any transversal rocking of the band and the spring and nipples hold the latter whilst leaving it free to move circumferentially.

In the modified form of construction shown in Figs. 12 to 14, the stop for the ends of the brake band or the pawls is adjustable. It consists of two threaded keys 43, 43' respectively screwed into pawls 2 and 2' and extending inwards at 44 and 44'. Said extensions are each provided with a slit 45, 45' within which is housed a turnscrew blade 46, 46' carried by a screw wheel 47 housed in a port formed in the body of the stop 8 against which pawls 2, 2' bear. Said screw wheel 47 may be rotated by a worm 48 actuated from without. The effect of the rotation of said worm is therefore to screw or to unscrew portions 44, 44' in the pawls 2, 2' and hence to cause them to jut to a greater or to a lesser extent from the pawls i. e. to adjust the starting point of their action upon the ends of the brake band. When the brake is applied, the pawls separate and portions 44, 44' screwed thereto slide along the turnscrew blades which remain stationary, but the split part of portions 44, 44' and the turnscrew blades 46, 46' are sufficiently long to maintain engagement.

This method of taking up brake play is of interest in that it brings back the whole of the brake rigging and connections to the initial position, at the optimum angles.

The invariability of the angle of contact of the lining with the drum makes it possible, thanks to the resulting uniformity of wear resulting therefrom for the lining, to give the latter the optimum shape in regard to the use of friction material i. e. to select, for a given arc, mean dimensions which decrease in area as the heel of the band is approached. It will thus be possible, for example, to provide a wedge-shaped lining 1a as shown in Fig. 15, the narrowest portion of which would be in the neighbourhood of front pawl 2' and the widest portion of which would be in the neighbourhood of rear pawl 2. A substantially similar result would be attained if, as shown in Fig. 16, the lining 1b were formed of steps or sections 1c of constant width but whose length increased as they progressed from pawl 2' towards pawl 2 or if, on the other hand, as shown in Fig. 17, the band 1d were formed of steps or sections 1e of increasing ability to withstand wear. The lining might also be given the shape of teeth in echelon or its wear-withstanding coefficient might be made variable, according to the periphery.

It is manifest that band 1 might likewise be fitted outside the brake drum to constitute a brake with outside lining. It would then be sufficient to surround the working ends of pawls 2, 2' with a double stop and to invert the direction of the control in order to close the levers instead of opening the same.

Having now particularly described and ascertained the nature of my said invention and in what manner the same is to be performed, I declare that what I claim is:

1. In a brake, in combination with a brake drum and a brake band having a lining subject to and capable of uniform wear, a stop for the ends of the band, and actuating levers centered substantially for their initial position at the center of curvature of the true circle substituted for the arc described by the end of the band passing through successive positions due to wearing of the lining.

2. A brake as claimed in claim 1, characterized in that the brake band presents a brake surface which increases in surface area in the direction of its forward running against the brake drum.

3. Band brake as claimed in claim 1, characterized in that the levers acting upon the ends of the band are actuated by an element which moves the lever acting in the direction of the rotation for the forward running of the drum to a lesser extent than the lever which acts in the inverse direction.

4. Band brake as claimed in claim 1, characterized in that the axes of the levers are carried by a common member adapted to slide upon a stationary guide in a movement substantially concentric with the axis of the brake drum.

5. In a brake, in combination with a brake drum and a brake band having a lining subject to and capable of uniform wear, actuating levers for the ends of the band, and movable means for supporting said levers, said means and levers each being connected by a floating pivotal pin centered for its initial position substantially at the center of curvature of the circle substituted for the arc described by the end of the band passing through successive positions due to wearing of the lining.

6. In a brake, in combination with a brake drum and a brake band having a lining subject to and capable of uniform wear, actuating levers for the ends of the band, swinging members for supporting said levers, said supports and levers each being connected by a floating pivotal pin centered for its initial position substantially at the center of curvature of the true circle substituted for the arc described by the end of the band passing through successive positions due to wearing of the lining.

7. In a brake, in combination with a brake drum and a brake band having a lining subject to and capable of uniform wear, actuating levers for the ends of the band, a slidable member for supporting said levers, said member and levers each being connected by a floating pivotal pin centered for its initial position substantially at the center of curvature of the true circle substituted for the arc described by the end of the band passing through successive positions due to wearing of the lining.

8. In a brake, in combination with a brake drum and a brake band having a lining subject to and capable of uniform wear, a stop for the ends of the band, actuating levers for the ends of the band, swinging members for supporting said levers, said supports and levers each being connected by a floating pivotal pin centered for its initial position substantially at the center of curvature of the true circle substituted for the arc described by the end of the positions due to wearing of the lining, and means necessarily shifting said pivotal centers upon actuation of said levers.

9. A brake in accordance with claim 6 wherein the length of said swinging member is substantially greater than the radius of said arc.

PIERRE MARIE FROMAGET.